United States Patent
Kim et al.

(10) Patent No.: US 10,142,214 B2
(45) Date of Patent: Nov. 27, 2018

(54) TRANSMISSION SYSTEM IMPLEMENTING DELAY MEASUREMENT AND CONTROL

(71) Applicant: GATESAIR, INC., Mason, OH (US)

(72) Inventors: Junius A. Kim, Cincinnati, OH (US); Keyur R. Parikh, Mason, OH (US)

(73) Assignee: GATESAIR, INC., Mason, OH (US)

( * ) Notice: Subject to any disclaimer, the term of this patent is extended or adjusted under 35 U.S.C. 154(b) by 0 days.

(21) Appl. No.: 15/355,374

(22) Filed: Nov. 18, 2016

(65) Prior Publication Data
US 2017/0237644 A1    Aug. 17, 2017

Related U.S. Application Data

(63) Continuation of application No. 14/164,943, filed on Jan. 27, 2014, now Pat. No. 9,525,611.

(51) Int. Cl.
*H04L 1/00* (2006.01)
*H04L 12/26* (2006.01)
(Continued)

(52) U.S. Cl.
CPC ........... *H04L 43/106* (2013.01); *H04H 20/67* (2013.01); *H04H 60/40* (2013.01); *H04J 3/0632* (2013.01); *H04J 3/0644* (2013.01); *H04J 3/0682* (2013.01); *H04L 43/0858* (2013.01); *H04L 47/283* (2013.01); *H04L 65/1059* (2013.01);
(Continued)

(58) Field of Classification Search
CPC .... H04L 43/106; H04L 65/607; H04L 65/608
See application file for complete search history.

(56) References Cited

U.S. PATENT DOCUMENTS 7,346,005 B1    3/2008    Dowdal
7,613,212 B1    11/2009   Raz et al.
(Continued)

FOREIGN PATENT DOCUMENTS

EP    2086237 A1    8/2009
EP    2262182 A1    12/2010
(Continued)

OTHER PUBLICATIONS

Akamine C, et al., "Re-Multiplexing ISDB-T BTS Into DVB TS for SFN", IEEE Transactions on Broadcasting, IEEE Service Center, Piscataway, NJ, US, vol. 55, No. 4, Dec. 1, 2009, pp. 802-809.
(Continued)

*Primary Examiner* — Shukri Taha
(74) *Attorney, Agent, or Firm* — Tarolli, Sundheim, Covell & Tummino LLP

(57) ABSTRACT

One embodiment includes a system. The system includes a receiver configured to extract a timestamp from a header of each packet of a data stream received from a network and to de-packetize the data stream to provide a stream of data blocks. The timestamp can correspond to generation of each data block associated with each respective packet of the data stream according to a global timebase. The system also includes a delay controller configured to measure a delay associated with each packet of the data stream based on the timestamp relative to the global timebase and to control converting the data stream to a corresponding analog output signal for transmission based on the measured delay.

20 Claims, 4 Drawing Sheets

(51) Int. Cl.
  *H04L 29/06* (2006.01)
  *H04L 29/08* (2006.01)
  *H04H 20/67* (2008.01)
  *H04H 60/40* (2008.01)
  *H04L 12/841* (2013.01)
  *H04J 3/06* (2006.01)

(52) U.S. Cl.
  CPC ......... *H04L 65/604* (2013.01); *H04L 65/607* (2013.01); *H04L 65/608* (2013.01); *H04L 65/80* (2013.01); *H04L 67/325* (2013.01); *H04L 69/04* (2013.01); *H04L 69/22* (2013.01); *H04L 69/24* (2013.01); *H04L 69/28* (2013.01)

(56) References Cited

U.S. PATENT DOCUMENTS

| | | | |
|---|---|---|---|
| 8,135,852 B2 | 3/2012 | Nilsson et al. | |
| 8,300,668 B2 | 10/2012 | Kim et al. | |
| 8,306,063 B2 | 11/2012 | Erdal et al. | |
| 2004/0190459 A1 | 9/2004 | Ueda et al. | |
| 2004/0258047 A1 | 12/2004 | Miao | |
| 2006/0146850 A1* | 7/2006 | Virdi | H04N 7/18 370/412 |
| 2006/0200852 A1 | 9/2006 | Simon | |
| 2008/0151776 A1 | 6/2008 | Kure | |
| 2008/0187009 A1 | 7/2008 | Kim et al. | |
| 2009/0083766 A1 | 3/2009 | Karne et al. | |
| 2009/0288125 A1 | 11/2009 | Morioka | |
| 2010/0135325 A1* | 6/2010 | Kim | H04J 3/0664 370/474 |
| 2010/0166042 A1 | 7/2010 | Iannuzzelli | |
| 2011/0002311 A1 | 1/2011 | Wang et al. | |
| 2011/0164117 A1 | 7/2011 | Hardy et al. | |
| 2011/0228888 A1* | 9/2011 | Gelter | H04L 49/90 375/371 |
| 2011/0305170 A1 | 12/2011 | Lai et al. | |
| 2012/0275333 A1 | 11/2012 | Cociglio | |

FOREIGN PATENT DOCUMENTS

| | | |
|---|---|---|
| EP | 2363972 A1 | 9/2011 |
| JP | 2008211587 | 9/2008 |
| WO | 2001/078408 A2 | 10/2001 |
| WO | 2005/114948 A1 | 12/2005 |
| WO | 2009/109069 A1 | 9/2009 |
| WO | 2009/154704 A1 | 12/2009 |
| WO | 2012018781 | 2/2012 |

OTHER PUBLICATIONS

French Patent Application No. 15 50605, Filed on Jan. 27, 2015, corresponding to U.S. Appl. No. 14/164,943, filed Jan. 27, 2014, in the name of Imagine Communications Corp.; Title: "Transmission System Implementing Delay Measurement and Control", Preliminary Search Report and Written Opinion, dated Jul. 7, 2017; dated Jul. 4, 2017, 13 pp.

* cited by examiner

TRANSMISSION SYSTEM IMPLEMENTING DELAY MEASUREMENT AND CONTROL

RELATED APPLICATION

This application is a continuation of U.S. application Ser. No. 14/164,943 filed Jan. 27, 2014, and entitled TRANSMISSION SYSTEM IMPLEMENTING DELAY MEASUREMENT AND CONTROL, which is incorporated by reference herein in its entirety.

TECHNICAL FIELD

This disclosure relates generally to network and communication systems, and more specifically to a transmission system implementing delay measurement and control.

BACKGROUND

Single frequency networks or RF simulcasting using multiple RF transmitters with overlapping receiver coverage areas can provide broadcasters with significant advantages in increased geographical coverage area and lower operating costs. The effectiveness of same-frequency overlapping transmitters can depend upon accurate synchronization of the carrier frequencies and modulating broadcast signal to provide substantially seamless reception with a minimum of artifacts. Within distribution networks of broadcast transmission providers, data transport is migrating towards Internet Protocol (IP) based packet-switched networks. IP networks offer the possibility of a highly flexible, converged network for many service types, including low-cost data transport. However, IP network delay can be dynamic and can change over time due to route changes, changes in router characteristics, or changes in link characteristics. Additionally, uncompressed broadcast data, such as audio or video data, can have a high bandwidth requirement which may not be suitable for many IP networks. Therefore, in these instances, data compression methods can be implemented to reduce network bandwidth and congestion.

SUMMARY

As one example, a system includes a receiver configured to extract a timestamp from a header of each packet of a data stream received from a network and to de-packetize the data stream to provide a stream of data blocks. The timestamp can correspond to creation of each data block associated with each respective packet of the data stream according to a global timebase. The system also includes a delay controller configured to measure a delay associated with each packet of the data stream based on the timestamp relative to the global timebase and to control converting the data stream to a corresponding analog output signal for transmission based on the measured delay.

Another example includes a method that includes sampling an analog signal to generate a data stream of data blocks and generating a timestamp associated with a first bit of a first sample of each data block of the data stream based on a global timebase. The method also includes converting the data stream of data blocks into a data stream of respective data packets and inserting the timestamp associated with each data block of the data stream into a timestamp field in a header of a respective one of the data packets of the data stream. The method further includes transmitting the data stream of data packets through a network to at least one transmitter configured to control a time of analog transmission of each data block of the data stream based on the timestamp.

Another example includes a simulcast transmission system. A broadcast controller generates a data stream of data blocks and packetizes each data block of the data stream for transmission via a network. The broadcast controller includes a timestamp component configured to generate a timestamp associated with generation of each respective data block of the data stream in a global timebase. The broadcast controller can be further configured to insert the timestamp associated with a given one of the data blocks into a header of a respective one of the data packets of the data stream. The system also includes a plurality of transmitters that each receives the data stream of data packets from the network. Each of the plurality of transmitters can be configured to extract the timestamp from the header of each of the data packets in the data stream and to convert the data stream into an analog output signal for simulcast transmission. Each of the plurality of transmitters can include a simulcast controller configured to measure a delay associated with each of the data blocks associated with each of the respective data packets in the data stream in the global timebase and to control at least a portion of the processing and conversion of the data stream into the analog output signal based on the measured delay to substantially synchronize transmission of the analog output signal from the plurality of transmitters.

DETAILED DESCRIPTION

Figure 1:
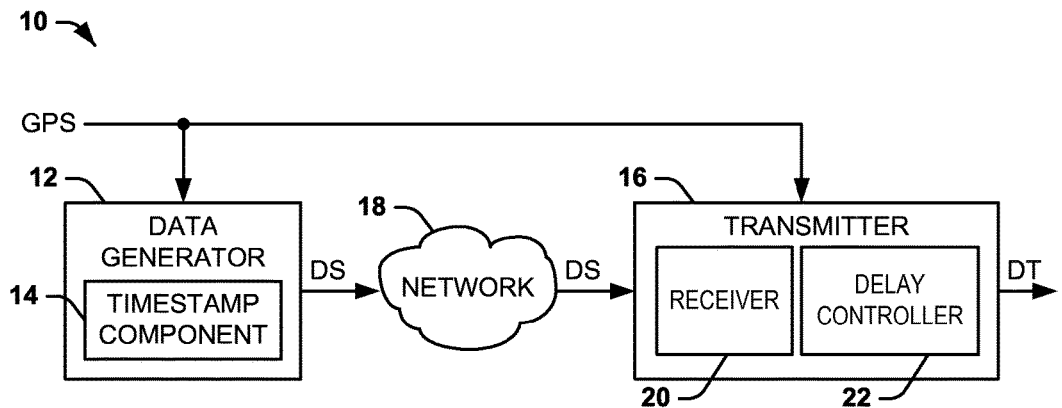
FIG. 1 illustrates an example of a transmitter system.

This disclosure relates generally to network and communication systems, and more specifically to a transmitter system implementing delay measurement and control. The systems and methods disclosed herein can be configured to measure a delay time of an aggregate communication process, such as including encoding, transmission (e.g., via a network), receiving and decoding of media content just prior to retransmission of a corresponding analog signal. A delay of the data stream through a receiver can be controlled as to control the time the data stream is converted into an analog output for broadcast transmission, such as by one or more RF transmitters.

As an example, a transmitter system, which can be implemented as a simulcast transmission system, includes a data generator that is configured to generate a stream of data comprising data blocks, such as pulse code modulated (PCM) data blocks. As an example, the transmitter system can be implemented in an audio transmission system, such as a broadcast RF system. The data generator can include a timestamp component configured to generate a timestamp associated with each of the data blocks based on a global positioning satellite (GPS) signal received at a local GPS receiver. For example, the timestamp for each data block represents the time, based upon the GPS signal, that the first bit of the first sample of the uncompressed data block was generated. As an example, uncompressed data blocks can be encoded into compressed data frames to provide data compression (e.g., audio compression) of the data blocks in a manner that the timestamp associated with each data block can be bound to the respective compressed data frame. Each of the data blocks or data frames can be packetized (e.g., as Real-time Transport Protocol (RTP) packets), and the timestamp associated with the respective one of the data blocks or compressed data frames can be inserted into the timestamp field of a header associated with the respective data packet. The data packets can then be transmitted via a network, such as an Internet Protocol (IP) network, to one or more transmitters (e.g., RF transmitters). As an example, in a simulcast transmission system, the data packets can be transmitted through the network to each of a plurality of transmitters located in separate geographical locations.

A given transmitter receives the data packets (e.g., RTP data packets) and can buffer the data packets in a jitter buffer. The transmitter can extract the timestamp from each of the data packets as the data packets are released from the jitter buffer and decoded. As an example, the transmitter can include a data decoder configured to convert a de-packetized compressed audio frame into a respective uncompressed data block, such that the timestamp can be associated with the data block. The transmitter includes a delay controller configured to measure a delay associated each of the respective data blocks. As an example, the delay controller can compute the delay by subtracting the local time, based on real time clock signals from a GPS receiver, from the time represented in the data block timestamp. The delay controller can compare the delay time with a preprogrammed delay time, and can control transmission of the data stream based on the comparison (e.g., controlling the delay via a jitter buffer). As a first example, the delay controller can adjust a sampling frequency of a digital-to-analog converter (DAC) that converts the data blocks to analog for wireless transmission of the data stream based on the comparison (e.g., in a hitless manner). As a second example, the delay controller can add or remove data to or from a jitter buffer between consecutive data packets based on the comparison (e.g., in a hitfull manner). The jitter buffer can be configured to store the received data packets, and can thus queue the data packets for wireless transmission from the transmitter. Therefore, the timing of the wireless transmission of the data stream can be controlled, such as to synchronize transmission of the data stream from each of the plurality of transmitters in a simulcast transmission system.

FIG. 1 illustrates an example of a transmitter system 10. The transmitter system 10 can be implemented in a variety of communications applications, such as audio/video broadcast communication. As an example, the transmitter system 10 can be implemented as part of a simulcast transmission system. The transmitter system 10 includes a data generator 12 that is configured to generate a data stream that includes data blocks, such as pulse code modulated (PCM) samples. As an example, the data blocks can be blocks of encoded data, such as can include a compressed audio data stream. In the example of FIG. 1, the data generator 12 includes a timestamp component 14 that is configured to generate a timestamp associated with each of the data blocks based on a global positioning satellite (GPS) signal, demonstrated in the example of FIG. 1 as a signal GPS. For example, the data generator 12 can include a GPS receiver configured to receive the signal GPS, such that the timestamp component 14 can provide a real-time timing reference for the timestamps. As an example, the timestamp for each data block represents the time that the first bit of the first sample of the data block was generated, and the timestamp for each data block can be inserted into a packet header associated with the respective the data block.

The data stream, demonstrated as a signal DS in the example of FIG. 1, is transmitted to a transmitter 16 via a network studio-to-transmitter link (STL) 18. As an example, the network STL 18 can be via an Internet Protocol (IP) network. Therefore, the network STL 18 can introduce a delay that is dynamic and which can change over time due to route changes, changes in router characteristics, and/or changes in link characteristics. The transmitter 16 is configured to receive the data stream DS and to then modulate the data stream onto an RF carrier signal. The resultant modulated signal, demonstrated as a signal DT, can be amplified and transmitted wirelessly via an antenna. As an example, the transmitter 16 can include a jitter buffer that is configured to queue the data blocks for transmission from the transmitter 16 as the transmitted wireless signal DT. For example, the transmitter 16 can be one of a plurality of transmitters that are each geographically separate from each other and are each configured to broadcast the data stream over separate coverage areas that can include overlapping regions with respect to each other. As an example, and as described herein, the transmission of the transmitted wireless signal DT can be substantially synchronized with transmission of the data stream from other transmitters that are provided the data stream DS from the data generator 12 via separate respective network STLs (see, e.g., FIG. 6).

The transmitter 16 includes a receiver 20 and a delay controller 22. The receiver 20 is configured to receive the data packets and can buffer the data packets in a jitter buffer. The receiver 20 is also configured to extract the timestamp from each of the data blocks in the data stream DS, such as from a header of the associated data packet (e.g., at a time that the data packet is released from the jitter buffer). The delay controller 22 can receive the timestamp associated with each of the data blocks in the data stream DS to measure a delay associated with the respective data blocks. As described herein, the term "delay" with respect to the data blocks of the data stream DS refers to an a time difference from creation of the respective data block (e.g., at ingest or sampling at the data generator 12) to a time just prior to the data block being transmitted from each transmitter 16 (e.g., a time at which the data is provided to a digital-to-analog converter (DAC)). For example, "delay" with respect to the data blocks of the data stream DS includes an aggregate delay associated with sampling and encoding of the data at the data generator 12, communication of the respective data block through the network STL 18, and buffering of the data block (as a data packet) at the transmitter 16, such as in the associated jitter buffer, and processing of the data block (e.g., including encoding and decoding for data compression during transmission through the network STL 18). In the example of FIG. 1, the delay controller 22 also receives the signal GPS, such that the delay controller 22 can subtract a time associated with the timestamp from a real-time reference (e.g., via a real-time clock) that is based on the signal GPS. Thus, the delay of the data blocks can be measured individually based on the extracted timestamp of each of the data blocks of the data stream DS.

In addition, the delay controller 22 can be further configured to control a transmission time associated with the transmitted wireless signal DT based on the measured delay of the data blocks. As an example, the delay controller 22 can be configured to compare the measured delay time with a preprogrammed delay time, and can be configured to control the conversion of the data blocks to an analog output signal, such as by controlling the queuing of the data blocks in the jitter buffer, based on the comparison of the measured delay time with the preprogrammed delay time. As an example, the delay controller 22 can adjust a sampling frequency of a digital-to-analog converter (DAC) that converts the data blocks to analog for wireless transmission of the transmitted wireless signal DT based on the comparison. As another example, the delay controller 22 can add or remove data to or from the jitter buffer between consecutive data packets based on the comparison. Thus, the time of transmission of the transmitted wireless signal DT can be controlled to time the transmission of the transmitted wireless signal DT in a flexible manner. For example, the delay controller 22 can control the time of the transmission of the transmitted wireless signal DT to substantially synchronize the transmission of the transmitted wireless signal DT with transmitted signals from other transmitters, such that the data stream is substantially concurrently transmitted from each of the transmitters, including the transmitter 16, in a time-aligned manner.

Figure 2:
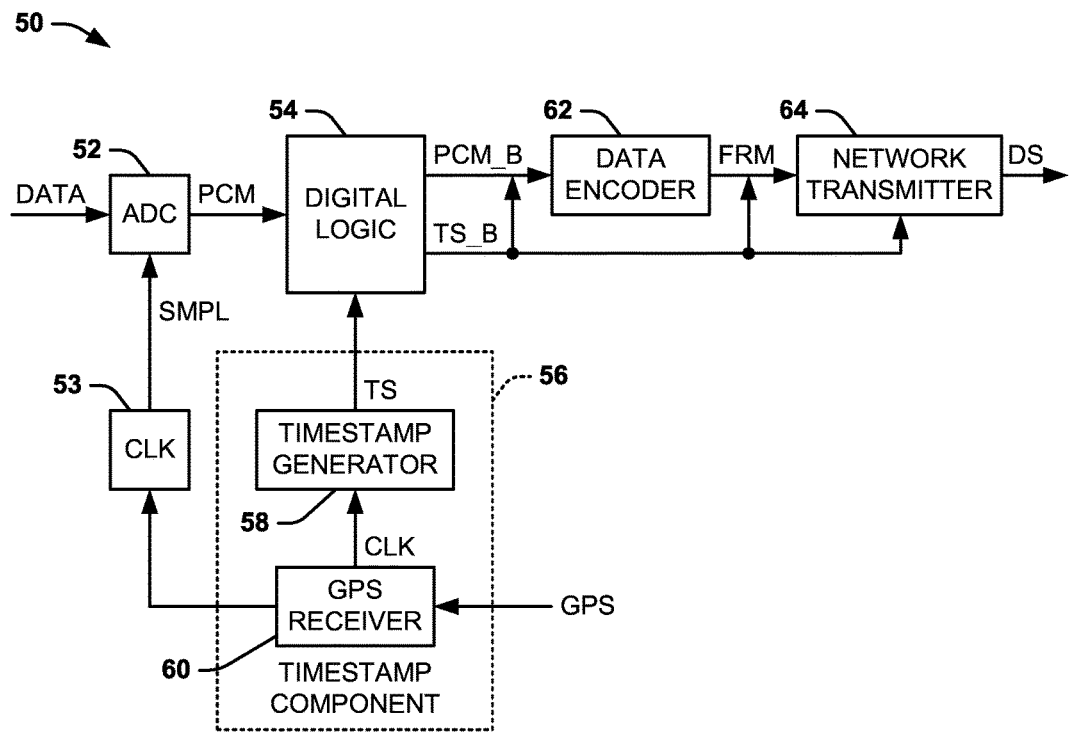
FIG. 2 illustrates an example of a data generator.

FIG. 2 illustrates an example of a data generator 50. As an example, the data generator 50 can correspond to the data generator 12 in the example of FIG. 1. Thus, the data generator 50 can be configured to generate and transmit time-stamped data blocks to an associated transmitter (e.g., the transmitter 16) via a network STL (e.g., the network STL 18). Thus, reference is to be made to the example of FIG. 1 in the following description of the example of FIG. 2.

The data generator 50 includes an analog-to-digital converter (ADC) 52 that is configured to convert an analog signal DATA to a serial data stream, demonstrated in the example of FIG. 1 as a signal PCM. The ADC 52 converts the analog signal DATA into the serial data stream PCM by sampling the analog signal DATA based on a sampling rate clock 53 (e.g., provided by a phase-locked loop (PLL)), which can be referenced to the GPS clock CLK. The signal PCM is provided to a digital logic component 54 that is configured to convert the serial data stream into data blocks, demonstrated as a signal PCM_B. As an example, the data blocks can be pulse-code modulated (PCM) data buffers (e.g., PCM audio samples). While the example of FIG. 2 demonstrates the use of the ADC 52 to provide the digital signal PCM, it is to be understood that the data stream PCM may be generated from a digital signal, such that the ADC 52 is obviated from the data generator 50. For example, AES3 is an industry standard protocol for local (e.g., studio environment) serial digital audio transport, and thus would not need the ADC 52. Instead, the conversion process from DATA to PCM could be performed by an AES3 receiver and sample rate converter. It is to be understood that the approach disclosed herein is applicable to various industry standards, including but not limited to AES3, for exchanging digital information. For instance, various standards exist for providing digital and analog means for communicating such information.

The data generator 50 includes a timestamp component 56. The timestamp component 56 includes a timestamp generator 58 and a GPS receiver 60 that receives the signal GPS. The GPS receiver 60 thus generates a real-time clocks signal CLK based on the signal GPS. As an example, the real-time clock signal CLK can include a plurality of clock signals having separate frequencies, such as a first clock signal having a frequency of 1 Hz, such as corresponding to the Coordinated Universal Time (UTC) second, and a second clock signal having a frequency of 10 MHz. The timestamp generator 58 is configured to generate a timestamp TS based on the real-time clock signal CLK in response to the first sample of the first bit of the analog signal DATA. As an example, the timestamp TS can have a range of values from 0 to 9,999,999, with a value of 0 corresponding to the very start of the UTC second. For example, the timestamp TS can have a 24-bit value.

For example, the digital logic component 54 can include a plurality of audio sample buffers configured to bind (i.e., associate) respective timestamps TS to respective data blocks (e.g., high and low addresses). As described previously, the timestamp TS associated with a data block PCM_B represents the time that the first bit of the first sample of the block was generated, and can thus correspond to a time of creation of the respective data block PCM_B. Thus, the timestamps TS can be stored or buffered with the binding or association to the respective data block PCM_B.

The data blocks PCM_B are provided to a data encoder 62 that is configured to encode the time-stamped data blocks by converting the data blocks PCM_B into compressed data frames FRM. For example, the data encoder 62 can implement an audio encoder algorithm function to convert the data blocks PCM_B to the compressed data frames FRM as compressed audio packets (e.g., MPEG, AAC, aptX, etc.). Thus, the compressed data frames FRM can be provided as encoded (compressed) audio frames. Based on the binding of the timestamps TS to the respective data blocks PCM_B, the binding of the timestamps TS can be preserved through the encoding process performed by the data encoder 62. Therefore, the timestamps TS can remain bound to respective corresponding compressed data frames FRM through the encoding process. The data encoder 62 function can also be bypassed, for uncompressed data transmission, in which case PCM_B data blocks are sent directly to a network transmitter 64.

Figure 3:
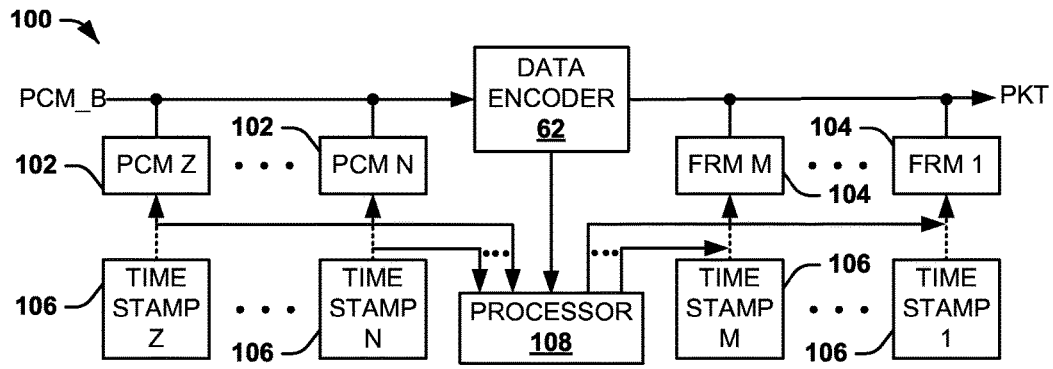
FIG. 3 illustrates an example of an encoder system.

FIG. 3 illustrates an example of an encoder system 100. The encoder system 100 includes the data encoder 62 that is demonstrated as converting uncompressed data blocks 102, demonstrated as "PCM N" through "PCM Z", into compressed data frames 104, demonstrated as "FRM 1" through "FRM M". In the example of FIG. 3, M is greater than 1, and thus denotes that FRM M is a subsequent data frame 104 with respect to FRM 1; N is greater than M, and thus denotes that FRM M has been processed by the data encoder 62 prior to PCM N; and Z is greater than N, and thus denotes that PCM Z is a subsequent data block 102 with respect to PCM N. Therefore, the designations of "1" through "Z" correspond to sequential numerical designations of the data blocks 102 and the compressed data frames 104, respectively, and where "1" is the newest designation and "Z" is the oldest. The data encoding process performed by the data encoder 62 ingests the data blocks 102 and egresses the compressed data frames 104. In the example of FIG. 3, the encoding process is performed on a one to one basis, such that the data encoder 62 provides a compressed data frames 104 for each data block 102 that is input. Each of the data blocks 102 and each of the compressed data frames 104 includes a respective timestamp 106 that is bound to the respective one of the data blocks 102 and compressed data frames 104. As an example, the timestamps 106 can be buffered or stored in the digital logic component 54 with the association (e.g., an identifier), such that the association of a given timestamp 106 is maintained through the encoding process in converting a respective data block 102 to a respective compressed data frame 104. As an example, an associated processor 108 can read the timestamp 106 for a given data block 102 and can create a binding element to programmatically associate the timestamp 106 with the respective data block 102, such as can be buffered or stored (e.g., queued) in the digital logic component 54. The processor 108 can then modify the binding element in response to the encoding of the data block 102 to the compressed data frame 104 (e.g., as read from the data encoder 62), such that the timestamp 106 can remain bound to the corresponding compressed data frame 104. That is, the timestamp 106 can remain associated with the corresponding compressed data frame 104 and be unchanged through the encoding process and distribution process. As disclosed herein, this enables a more accurate delay measurement and thus can improve synchronization of simulcast transmissions.

Referring back to the example of FIG. 2, the compressed data frames FRM are provided to a network transmitter 64. As an example, the network transmitter can be a Real-Time Transport Protocol (RTP) transmitter, such as can employ Internet Protocol (IP) over User Datagram Protocol (UDP), such that the compressed data frames FRM correspond to an IP payload. Therefore, the network transmitter 64 is configured to packetize the compressed data frames FRM as payload data for transmission over the network STL 18. As an example, each of the packets can correspond to a respective compressed data frame FRM. Thus, the network transmitter 64 can transmit the data stream DS including the compressed data frames FRM over the network STL 18, such as an IP network. In the example of FIG. 2, the timestamps TS that are bound to the respective compressed data frames FRM, demonstrated as bound timestamps TS_B, are provided from the digital logic component 54 to the network transmitter 64, such that the network transmitter 64 can insert the bound timestamps TS_B into a header of the respective packets. The bound timestamp TS_B further can include binding data, such as data link, that specifies the data block (e.g., a compressed or uncompressed frame) to which it has been associated. Thus, the bound timestamp TS_B can remain bound to the respective data block PCM_B and data frame FRM through the processing via the data encoder 62 to be inserted into the respective header of the data block PCM_B and corresponding data frame FRM. As an example, the network transmitter 64 can populate an RTP timestamp field with the bound timestamp TS_B associated with the respective compressed data frame FRM. For example, the bound timestamp TS_B (e.g., having 24 bits) can be right justified into the RTP timestamp field (e.g., a 32-bit word).

It is to be understood that the data generator 50 is not intended to be limited to the example of FIG. 2. For example, the data encoder 62 can be omitted to provide the data blocks PCM_B as linear or uncompressed data. Thus, the data stream PCM_B can be provided directly to the network transmitter 64 for transmission of packetized data blocks, having the timestamp field being provided the bound timestamp TS_B, through the network STL 18. Thus, the data generator 50 can be configured in a variety of ways.

Figure 4:
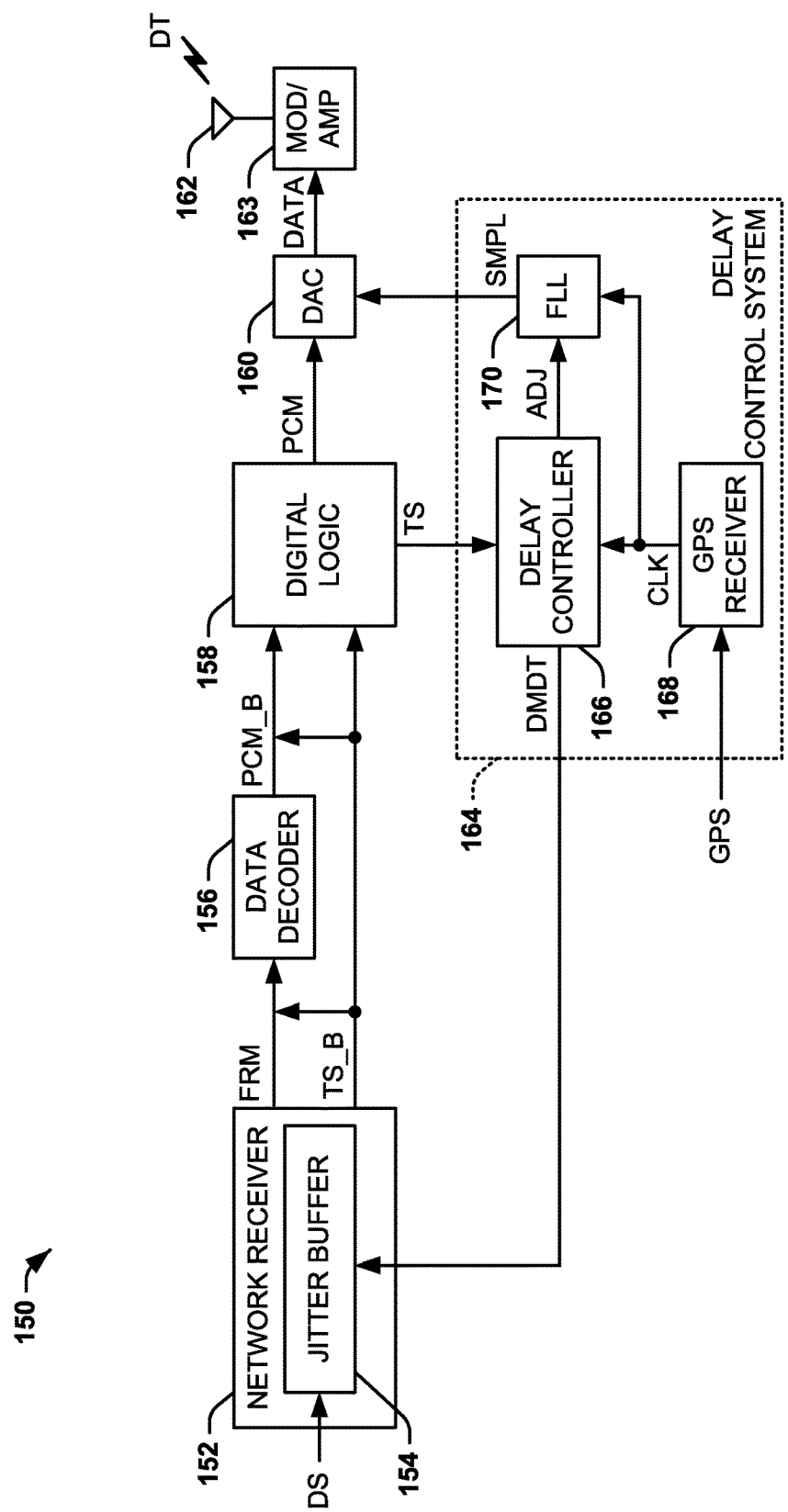
FIG. 4 illustrates an example of a transmitter.

FIG. 4 illustrates an example of a transmitter 150. As an example, the transmitter 150 can correspond to the transmitter 16 in the example of FIG. 1. Thus, the transmitter 150 can be configured to receive the time-stamped data packets from the data generator 12 (e.g., the data generator 50) via a network STL (e.g., the network STL 18) and can measure a delay and control a time of wireless transmission of the data blocks. Thus, reference is to be made to the example of FIG. 1 in the following description of the example of FIG. 4.

The transmitter 150 includes a network receiver 152 that receives the data stream DS from the data generator 12 via the network STL 18. As an example, the network receiver 152 can be configured as an RTP receiver. In the example of FIG. 4, the network receiver 152 includes a jitter buffer 154 that is configured to queue the data packets that are provided in the data stream DS. As described herein, the jitter buffer 154 can provide a controllable delay of the release of the data packets (e.g., frames) 104 from the jitter buffer 154. The data packets of the data stream DS are provided from the jitter buffer 154 as compressed data frames FRM to a data decoder 156 that is configured to convert the compressed data frames FRM back to the respective data blocks PCM_B.

Additionally, the network receiver 152 can read the timestamp that is bound to the payload corresponding to a respective compressed data frame FRM from each of the data packets in the data stream DS. As an example, the network receiver 152 can read the timestamp that is bound to the RTP payload (e.g., the respective compressed audio frame FRM) from an RTP timestamp field in the header of the RTP packet. For example, the network receiver 152 can read the bound timestamp TS_B from the packet header upon release and de-packetization of the corresponding packet from the jitter buffer 154. In addition, in response to the data decoder 156 decoding the compressed data frames FRM to provide the respective data blocks PCM_B, an associated processor (not shown) can maintain binding of the timestamps TS_B from the compressed data frames FRM to the decoded data blocks PCM_B, in a similar opposite manner to that described previously in the example of FIG. 3. Therefore, the bound timestamp TS_B can remain bound to the respective data frame FRM and data block PCM_B through the processing via the data decoder 156. The data decoder 156 function can also be bypassed, such as for uncompressed data transmission, in which case data blocks PCM_B are provided directly from the jitter buffer 154.

The timestamps TS_B that are read from the data packets by the network receiver 152 are provided to a digital logic component 158, such that the digital logic component 158 can store the timestamps TS_B and maintain the binding of the timestamps TS_B with the respective compressed data frames FRM, and thus the respective data blocks PCM_B. The data blocks PCM_B are likewise provided from the data decoder 156 to the digital logic component 158. The digital logic component 158 can serialize the data blocks PCM_B to provide a serial digital data stream PCM corresponding to the data blocks PCM_B. The digital data stream PCM is provided to a digital-to-analog converter (DAC) 160 that is configured to convert the serial data stream PCM corresponding to the data blocks PCM into an analog signal DATA. The analog signal DATA is modulated and amplified onto a RF carrier signal by a modulator/amplifier system 163. The wireless signal DT is transmitted via antenna 162. As an example, the wireless signal DT can be transmitted as a broadcast audio signal from the antenna 162 over a coverage area, such as in a simulcast transmission system. While the example of FIG. 4 demonstrates the use of the DAC 160 to provide the analog signal DATA which can be audio or video data, it is to be understood that the analog signal DATA could instead be implemented as a digital signal, such that the DAC 160 is obviated from the transmitter 150. For example, AES3 is an industry standard protocol for local (e.g., studio environment) serial digital audio transport, and thus would not require the DAC 160. Instead the conversion process from PCM to DATA would be replaced by an AES3 transmitter. It is to be understood that the approach disclosed herein is applicable to various industry standards, including but not limited to AES3, for exchanging digital information.

Additionally, the digital logic component 158 can provide the timestamp TS associated with each of the respective data blocks PCM_B to a delay control system 164. The delay control system 164 includes a delay controller 166, a GPS receiver 168, and a frequency-locked loop (FLL) 170. The GPS receiver 168 generates a real-time clocks signal CLK based on the signal GPS. Similar to as described previously, the real-time clock signal CLK can include a plurality of clock signals having separate frequencies, such as a first clock signal having a frequency of 1 Hz, such as corresponding to the UTC second, and a second clock signal having a frequency of 10 MHz. The extracted timestamps TS are provided to the delay control system 164, such that the delay controller 166 is configured to measure the delay of transmission of the PCM serial data stream at the ADC 52 to the PCM serial data stream at the DAC 160 based on the real-time clock signal CLK. Therefore, based on the measured delay, the delay controller 166 can control the time of the of the respective data block being provided to the DAC 160, such as based on manipulating the jitter buffer 154.

Figure 5:
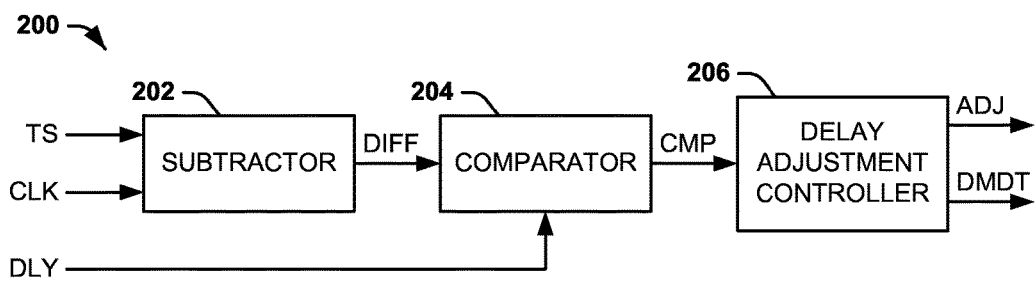
FIG. 5 illustrates an example of a delay control system.

FIG. 5 illustrates an example of a delay control system 200. The delay control system 200 can correspond to the delay controller 166 in the example of FIG. 4. Therefore, reference is to be made to the example of FIG. 4 in the following description of the example of FIG. 5 to provide additional context.

The delay control system 200 includes a subtractor 202 that receives the real-time clock signal CLK and a respective timestamp TS. The subtractor 202 can thus be configured to calculate the delay of the transmission of the PCM serial data stream at the ADC 52 to the PCM serial data stream at the DAC 160 by subtracting the time associated with the respective timestamp TS from real-time, as provided by the real-time clock signal CLK. Because the timestamp TS was generated based on the GPS signal, the time associated with the timestamp TS (e.g., the timestamp 106) is provided in absolute time, and because the real-time clock signal CLK is generated based on the GPS signal, the units of time between the timestamp TS and the real-time clock signal CLK correspond. Therefore, the subtractor 202 generates a difference signal DIFF that corresponds to the delay of the STL system. This delay measurement includes the delay associated with the entire STL system, including the encoding delay, the decoding delay, the network delay, and other types of delay, such as the delay in the jitter buffer 154. This delay measurement for the entire STL system is performed for every data block. The time that the delay calculation is performed includes the time that the first bit of a first sample of a data block is converted to PCM samples. The timestamp TS is created at the first bit of the first sample of the data block. Therefore, the delay calculation for measuring the delay of the entire STL system is thus associated with the first bit of the first sample of the data block. It is understood that the timestamp TS is created is an example only, such that the time of creation of the timestamp TS could instead be created at any time associated with the data block as long as the time of delay calculation in the subtractor 202 is same as the time of creation.

The difference signal DIFF is provided to a comparator 204 that is configured to compare the difference signal DIFF, and thus the time of transmission of the PCM serial data stream at the ADC 52 to the PCM serial data stream at the DAC 160, with a preprogrammed delay time DLY. As an example, the preprogrammed delay time DLY can be associated with a standardized delay time associated with each transmitter in a simulcast transmission system. The preprogrammed delay time DLY can thus correspond to a time duration that can be associated with a worst-case scenario with respect to the time of transmission of the PCM serial data stream at the ADC 52 to the PCM serial data stream at the DAC 160. The comparator 204 can thus generate a comparison signal CMP that can correspond to an error signal associated with a difference between the difference signal DIFF and the preprogrammed delay time DLY. The comparison signal CMP is provided to a delay adjustment controller 206 that is configured to control the time of transmission of the data block 102 from the transmitter 150. In the example of FIG. 5, the delay adjustment controller 206 is demonstrated as generating a first signal ADJ and a second signal DMDT that are each provided to implement delay control of the data packets 104 in the jitter buffer 154, and thus controlling time of transmission of the data blocks 102 from the transmitter 150. As described herein, the signals ADJ and DMDT can be provided in alternative methods of delay control. However, while the delay control system 200 can use one of the signals ADJ and DMDT to provide the delay control, it is to be understood that the delay control system 200 could implement both methods of delay control concurrently to control the time of transmission of the data blocks 102 from the transmitter 150.

Referring back to the example of FIG. 4, the first signal ADJ is provided to the FLL 170. The FLL 170 is configured to provide a sampling signal SMPL to the DAC 160 that defines a sampling frequency of the DAC 160 in converting the serial samples of the data blocks 102 to the analog signal DATA for wireless transmission via the antenna 162. Thus, the signal ADJ can be provided as an adjustment signal to change the frequency of the sampling signal SMPL, and thus the sampling rate of the DAC 160. Because the signal ADJ is generated by the delay adjustment controller 206 based on the comparison signal CMP, and thus based on the time of transmission of the PCM serial data stream at the ADC 52 to the PCM serial data stream at the DAC 160 relative to the preprogrammed delay time DLY, the signal ADJ can adjust the sampling rate to control the delay of the wireless transmission of the data blocks 102 from the transmitter 150 in a hitless manner (e.g., no loss of data continuity). As an example, the FLL has a frequency reference provided by the GPS based real-time clock signal CLK. Therefore, under static conditions, where the amount of data stored in jitter buffer is constant, the frequency of the sampling signal SMPL provided to the DAC 160 is the same as the frequency of the sampling signal provided to the ADC 52.

As an example, the signal ADJ can increase the frequency of the sampling signal SMPL, and thus the sampling rate of the DAC 160, to decrease a time of wireless transmission of the data blocks 102 from the transmitter 150. As another example, the signal ADJ can decrease the frequency of the sampling signal SMPL, and thus the sampling rate of the DAC 160, to increase a time of wireless transmission of the data blocks 102 from the transmitter 150. Because the data packets 104 that are decoded to become the corresponding data blocks 102 are queued in the jitter buffer 154, the adjustment to the sampling rate of the DAC 160 via the signal ADJ thus indirectly controls the amount of data queued in the jitter buffer 154. For example, the adjustment to the sample rate can control the amount of data being queued in the jitter buffer to be directly proportional to the delay in the jitter buffer 154. Accordingly, the frequency of the sampling signal SMPL can be continuously adjusted in a closed loop manner, such that the comparison signal CMP converges to approximately zero to set the delay of the data blocks 102 approximately equal to the preprogrammed delay DLY. The change in frequency of the sampling signal SMPL is applied over a period of time. The delay change effected in the jitter buffer 154 is thus proportional to the change in frequency and the amount of time the change is in effect.

As another example, the second signal DMDT is provided to the jitter buffer 154 and can correspond to dummy data packets. As an example, the dummy data packets in the second signal DMDT can be inserted between consecutive data packets in the jitter buffer 154. Therefore, the amount of dummy data packets in the second signal DMDT that are inserted between the consecutive data packets can add to the delay of the data blocks 102 that are eventually processed from the jitter buffer 154. As another example, the second signal DMDT can be configured to remove data packets. As a result, the amount of data contained in the jitter buffer 154 can be reduced and the delay of the data blocks 102 can be decreased.

As described previously, the delay adjustment controller 206 can generate either the first signal ADJ or the second signal DMDT to change the delay of the data blocks 102, and thus the time of transmission of the data stream DS from the transmitter 150. For example, the delay adjustment controller 206 can implement the first signal ADJ to change the delay of the data blocks 102 to provide more seamless audio quality for listeners (e.g., based on not having data removed from or dummy data packets added to the jitter buffer 154), or can implement the second signal DMDT to provide more rapid changes to the delay of the data blocks 102. However, the delay adjustment controller 206 could be configured to implement both the first signal ADJ and the second signal DMDT, such as in combination, to achieve the benefits of both types of delay control.

Figure 6:
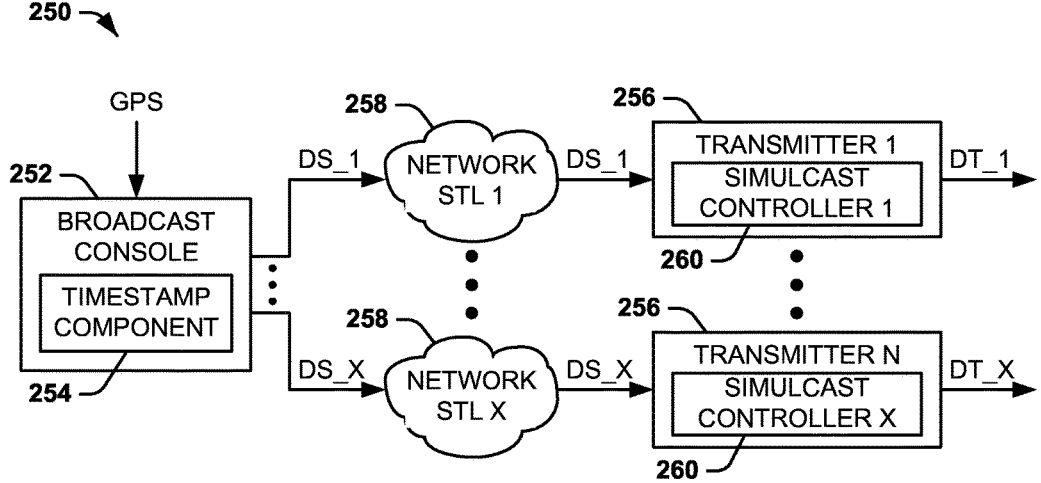
FIG. 6 illustrates an example of a simulcast transmission system.

FIG. 6 illustrates an example of a simulcast transmission system 250. The simulcast transmission system 250 can be implemented in a variety of communications applications, such as audio/video broadcast communication from a plurality of geographically separate transmitters. The simulcast transmission system 250 includes a broadcast controller 252 that is configured to generate a data stream that includes data blocks, such as PCM samples of raw data. As an example, the data blocks can be blocks of audio data. In the example of FIG. 6, the broadcast controller 252 includes a timestamp component 254 that is configured to generate a timestamp associated with each of the data blocks based on a GPS signal, demonstrated in the example of FIG. 6 as a signal GPS. For example, the broadcast controller 252 can include a GPS receiver configured to receive the signal GPS, such that the timestamp component 254 can provide a real-time timing reference for the timestamps. The timestamps can thus each correspond to a time of creation of the respective data blocks (e.g., corresponding to a first bit of a first sample of each of the data blocks). As an example, the timestamps can be bound to the data blocks during processing and conversion of the data blocks, such as to encode the data blocks into compressed data frames and into respective data packets for transmission from the broadcast controller 252.

The timestamp associated with each data block can be inserted into each respective packet of the data stream (e.g., in a header), and the data stream of packets is transmitted to a plurality X of transmitters 256 via a respective plurality N of network STLs 258 as signals DS_1 through DS_X, where X is a positive integer greater than one. As an example, the network STLs 258 can be IP network connections, such that the data stream of packets DS_1 through DS_X corresponds to an IP multicast of the data stream DS. Therefore, the network STLs 258 can each introduce a delay that is dynamic and which can change over time due to route changes, changes in router characteristics, and/or changes in link characteristics with respect to each other. The transmitters 256 are each configured to receive the data stream DS and to transmit the data stream as respective transmitted signals DT_1 through DT_N, such as wirelessly via antennas. As an example, each of the transmitters 256 can include a jitter buffer (e.g., the jitter buffer 154) that is configured to queue the data packets corresponding to the data blocks for transmission from the respective transmitter 256. For example, the transmitters 256 can each be configured to broadcast the respective transmitted signals DT_1 through DT_N over separate coverage areas that can include overlapping regions with respect to each other. As an example, and as described herein, the transmission of the transmitted signals DT_1 through DT_N can be substantially synchronized with respect to each other.

The transmitters 256 are each configured to extract the timestamp from each of the data packets in the respective data streams DS_1 through DS_N (e.g., from a header). In the example of FIG. 6, the each of the transmitters 256 includes a simulcast controller 260 that can extract the timestamp from each of the data blocks in the data stream DS to measure a delay time associated with the transmission of the respective data blocks through the network STL 258. In the example of FIG. 6, the simulcast controller 260 also receives the signal GPS, such that the simulcast controller 260 can subtract a time associated with the timestamp from a real-time reference (e.g., via a real-time clock) that is based on the signal GPS. Thus, the delay of each of the data blocks through the respective network STLs 258 can be measured individually based on the extracted timestamp of each of the data blocks of the data streams DS_1 through DS_N.

In addition, the simulcast controller 260 can be further configured to control a transmission time associated with the transmitted signals DT_1 through DT_N based on the delay time of the data blocks. As an example, the simulcast controller 260 in each of the transmitters 256 can be configured to compare the measured delay time with a preprogrammed delay time, and can be configured to control the queuing of the data blocks in the jitter buffer based on the comparison of the measured delay time with the preprogrammed delay time. As an example, the delay controller 22 can adjust a sampling frequency of a digital-to-analog converter (DAC) that converts the data blocks to analog for wireless transmission of the transmitted wireless signal DT based on the comparison. As another example, the delay controller 22 can add or remove dummy data packets to or from the jitter buffer between consecutive data blocks based on the comparison. Thus, the time of transmission of the transmitted signals DT_1 through DT_N can be synchronized, such that the data stream is substantially concurrently transmitted from each of the transmitters 256, including the transmitter 256, in a time-aligned manner. Accordingly, in the example of an audio/video simulcast system, users can experience substantially seamless reception of the audio/video data with substantially minimal artifacts.

Figure 7:
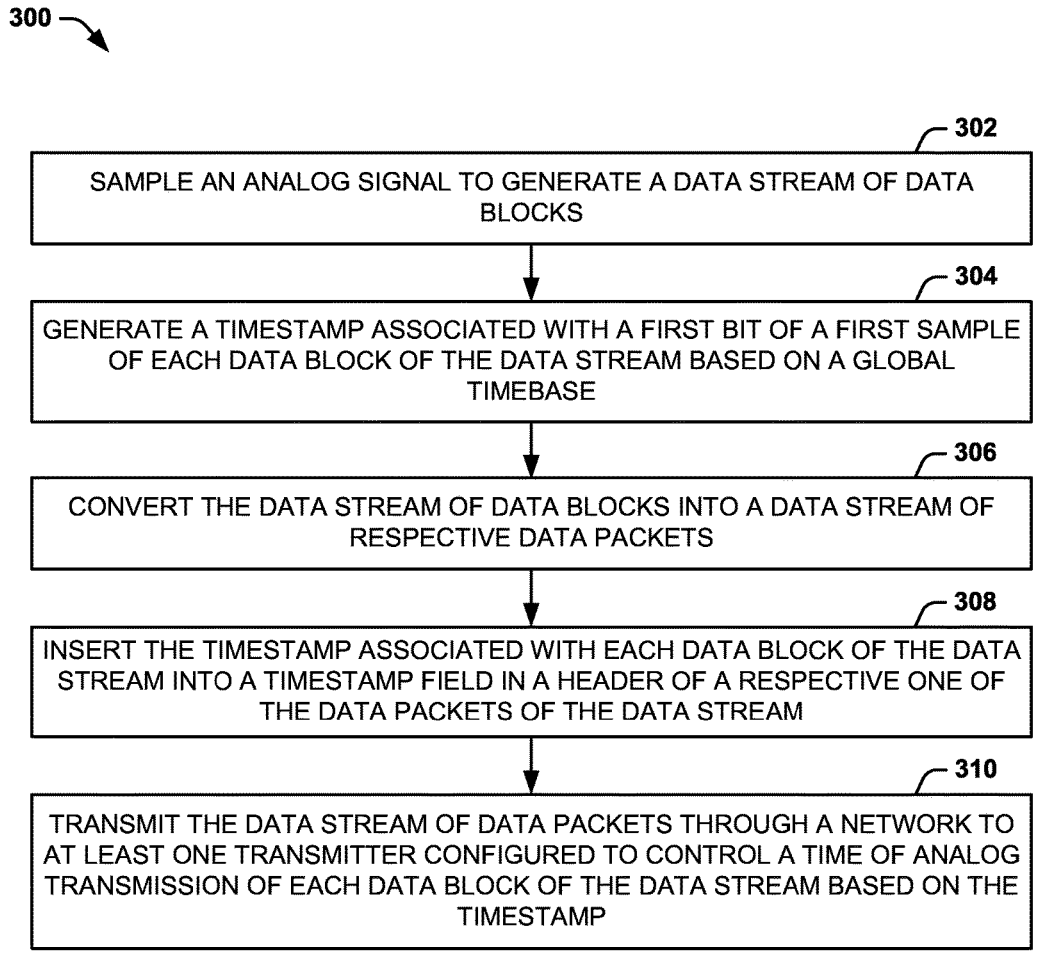
FIG. 7 illustrates a method for controlling a signal transmission delay.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates a method 300 for controlling a signal transmission delay. At 302, an analog signal (e.g., the analog signal DATA) is sampled to generate a stream of data blocks (e.g., the data stream DS of data blocks 102). At 304, a timestamp (e.g., the timestamp 106) associated with a first bit of a first sample of each data block of the data stream based is generated on a global timebase (e.g., the signal GPS). At 306, the data stream of data blocks is converted into a data stream of respective data packets (e.g., the data stream DS). At 308, the timestamp associated with each data block of the data stream is inserted into a timestamp field (e.g., an RTP timestamp field) in a header of a respective one of the data packets of the data stream. At 310, the data stream of data packets is transmitted through a network (e.g., the network STL 18) to at least one transmitter (e.g., the transmitter 16) configured to control a time of analog transmission of each data block of the data stream based on the timestamp.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   an analog-to-digital converter that converts an analog signal, received at an input thereof, to a serial data stream;
   a timestamp component that generates corresponding timestamps based on a global time base;
   digital logic that converts the serial data stream into data blocks, the digital logic binding the corresponding timestamps, representative of times that the respective data blocks were generated, to the respective data blocks;
   a data encoder that encodes the time-stamped data blocks by converting the data blocks into compressed data frames provided at an encoder output, the binding of the timestamps to the respective data blocks being preserved through the data encoder.

2. The system of claim 1, further comprising a network transmitter that transmits, via a network, a data stream that includes the compressed data frames.

3. The system of claim 2, further comprising at least one other transmitter configured to receive the data stream via the network and to modulate the data stream onto a radio frequency carrier signal.

4. The system of claim 3, wherein the other transmitter further comprises:
   a receiver configured to extract the timestamp from each packet of the data stream received from the network and to de-packetize the data stream to provide a stream of data blocks; and
   a delay controller configured to measure a delay associated with each packet of the data stream based on the timestamp relative to the global timebase and to control transmission of the serial data stream as a wireless signal based on the measured delay.

5. The system of claim 4, wherein the other transmitter further comprises a digital-to-analog converter that converts the data blocks to a corresponding analog signal for the transmission thereof the data stream,
   wherein the delay controller of the other transmitter adjusts a sampling frequency of the digital-to-analog converter based on a comparison of the measured delay relative to a predetermined delay time to control the conversion to the corresponding analog signal.

6. The system of claim 5, wherein the receiver of the other transmitter further comprises a jitter buffer that is configured to queue the data blocks for the transmission as the wireless signal,
   wherein the delay controller is configured to add or remove data to or from the jitter buffer between consecutive data packets based on the comparison of the measured delay relative to the predetermined delay time.

7. The system of claim 4, wherein the receiver of the other transmitter further comprises a jitter buffer that is configured to queue the data blocks for the transmission as the wireless signal,
   wherein the delay controller is configured to add or remove data to or from the jitter buffer between consecutive data packets based on a comparison of the measured delay relative to a predetermined delay time.

8. The system of claim 3, wherein the at least one other transmitter comprises a plurality of transmitters that each receive the data stream via the network, each of the plurality of transmitters being configured to extract the timestamp from each of the data packets in the data stream and to process and convert the data stream into an analog output signal for simulcast transmission, each of the plurality of transmitters comprising a simulcast controller configured to measure a delay associated with each of the data blocks associated with each of the respective data packets in the data stream based on the timestamp relative to the global timebase and to control at least a portion of the processing and conversion of the data stream into the analog output signal based on the measured delay to synchronize transmission of the analog output signal from the plurality of transmitters.

9. The system of claim 1, wherein the analog-to-digital converter samples the analog signal based on a sampling rate clock, the sampling rate clock providing a real-time clock signal that is referenced to the global time base, the timestamp component being configured to generate the timestamp based on the real-time clock signal to correspond to the time of generation of the first bits of the first samples of each of the respective data blocks of the data stream.

10. The system of claim 1, further comprising a network transmitter that transmits a data stream via a network, a bypass path providing the data blocks from the digital logic to the network transmitter for transmission of uncompressed data in the data stream.

11. A system comprising:
    a transmitter that transmits a wireless signal, the transmitter comprising:
    a network receiver configured to extract a timestamp from a header of each packet of a data stream received from a network, the timestamp corresponding to a time of generating each data block for each respective packet of the data stream according to a global timebase prior to a time of packetizing each data block into a respective packet, the receiver further configured to store the data blocks in a buffer of the receiver and to provide a data stream of the data blocks;
a digital-to-analog converter that converts the data blocks to a corresponding analog signal for transmission thereof in the wireless signal according to a sampling frequency; and
a delay controller that measures a delay associated with each data block of the data stream based on the timestamp relative to the global timebase, the delay controller controlling a time of the transmission of the analog signal from the transmitter based on at least one of (i) adjusting the sampling frequency of the digital-to-analog converter and (ii) adding or removing of data between the data blocks in the buffer.

12. The system of claim 11, wherein the receiver provides the data stream of the data blocks to include compressed data frames, the system further comprising a decoder configured to implement a decoding process to convert each compressed data frame of the data stream into a respective data block, wherein the timestamp that is extracted from the header of the respective data packet is bound to the respective compressed data frame through the decoding process to be associated with the respective data block.

13. The system of claim 12, further comprising digital logic that serializes the data blocks provided by the decoder to provide a serial digital data stream to the digital-to-analog converter, the digital-to-analog converter converting the serial data stream into the analog signal for transmission by the transmitter.

14. The system of claim 13, wherein the delay controller extracts the timestamp from the respective data blocks and provides the extracted timestamp to the delay controller for measuring the delay associated with associated with each data block.

15. The system of claim 14, wherein the global timebase corresponds to a global positioning satellite (GPS) signal, wherein the delay controller comprises:
a GPS receiver that generates a real time clock signal; and
a subtraction component that determines the measured delay associated with each data block of the data stream based on a difference between a local time from the GPS receiver and the time represented in the timestamp for the respective data block.

16. The system of claim 15, wherein the delay controller further comprises:
a comparator to compare the measured delay relative to a preprogrammed delay to generate a comparison signal; and
a delay adjustment controller to adjust the time of the transmission of each data block of the data stream based on the comparison signal.

17. The system of claim 11, wherein the delay controller is configured to add or remove dummy data packets to or from between consecutive data packets stored in the buffer to adjust based on a comparison of the measured delay relative to a predetermined delay time.

18. The system of claim 11, further comprising a plurality of the transmitters that each receive the data stream via the network, each of the plurality of transmitters being configured to extract the timestamp from each of the data packets in the data stream and to process and convert the data stream into an analog output signal for synchronized simulcast transmission of the analog output signal from each of the plurality of transmitters.

19. The system of claim 11, further comprising a data generator, the data generator comprising:
an analog-to-digital converter that converts an analog signal, received at an input thereof, to a serial data stream;
a timestamp component that generates corresponding timestamps based on the global time base;
digital logic that converts the serial data stream into the data blocks, the digital logic binding the corresponding timestamps to respective data blocks; and
a network transmitter that provides the data stream to the network for receipt by the network receiver.

20. The system of claim 19, wherein the data generator further comprises a data encoder that encodes the time-stamped data blocks by converting the data blocks into compressed data frames provided at an encoder output, the binding of the timestamps to the respective data blocks being preserved through the data encoder.

* * * * *